Geza von Voros
Inventor
By Robert A. Shields
Attorney

June 2, 1964        G. VON VOROS        3,135,857

METHOD AND APPARATUS FOR ELECTRONICALLY GUIDED WELDING

Filed Jan. 11, 1960        6 Sheets-Sheet 2

Geza von Voros
Inventor
By Robert A. Shields
Attorney

Geza von Voros
Inventor

By Robert A. Shield
Attorney

United States Patent Office 3,135,857
Patented June 2, 1964

1

3,135,857
METHOD AND APPARATUS FOR ELECTRONI-
CALLY GUIDED WELDING
Geza von Voros, Berwick, Pa., assignor to ACF Industries, Incorporated, New York, N.Y., a corporation of New York
Filed Jan. 11, 1960, Ser. No. 1,656
24 Claims. (Cl. 219—125)

This invention relates to an electronic guiding system for tracing predetermined courses and more particularly to a photo-electric device for directing a welding head over a course to be welded and described by brightness differences between adjacent areas of the course. More specifically, the invention relates to a photo-electric sensing head mounted for continuous positioning along a welding course and utilizing a plurality of miniature photo-sensors or photo-electric cells disposed in the focal plane of an image of the course to be followed, each photo-sensor being selectively connected for alternate use or use simultaneously with another or the other photo-sensors depending upon the several methods of course following employed. It relates to the methods by which the photo-sensors can be used to detect very small errors in direction along the course to be followed and to the circuitry in which they form components.

The objects of the invention include the provision of a photo-electric device employing a lens unit for magnifying an image of the welding course in the plane of miniature photocells whereby the sensitive surfaces of the cells detect very slight variances along the course areas and thus increase the accuracy of the system while permitting the sensing unit of the system to be positioned out of the heat area of a guided welding head.

It is an object of this invention to provide a guiding system with no mechanical, magnetic or electrical contact between the system and the course to be followed and one which permits a welding head to closely follow the course of the sensing head of the system to eliminate the necessity for delay systems in certain applications while at the same time eliminating the influences of welding arc flashes and changes of the index of reflection of a work piece. In this respect the plurality of photocells and their disposition in the circuitry of the system permits photocell sensing in very high ranges of light intensity.

Other objects and advantages of the invention will become apparent from the following description taken in connection with the accompanying drawings.

FIGURES 12a and b show a lap joint being followed.

FIGURE 12c shows an edge course being followed.

FIGURES 1 through 4 illustrate photocell-optical head 25 which comprises an elongated telescoping chamber defined by the inner surfaces of a front piece 26, a rear piece 27 and two intermediate cylinder sections 28 and 29. The circumferences of the outer surfaces of revolution of the pieces and sections diminish from the rear piece to the front piece for insertion and telescoping action between the parts.

Figure 3:
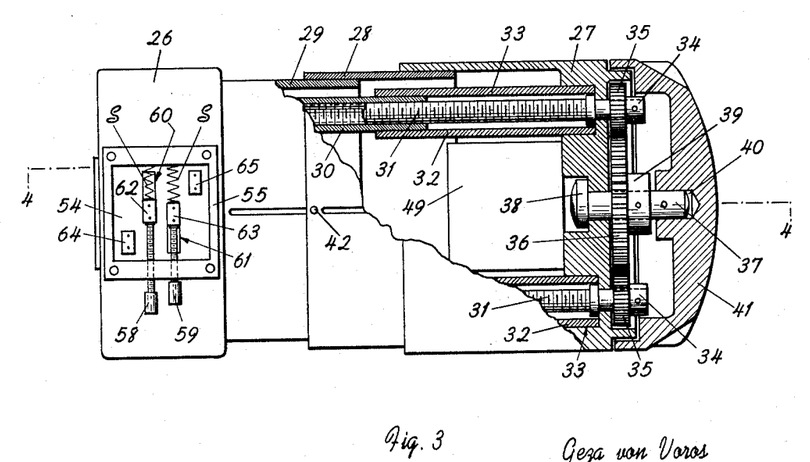
FIGURE 3 is an elevation of the optical head, with parts broken away.
Figure 4:
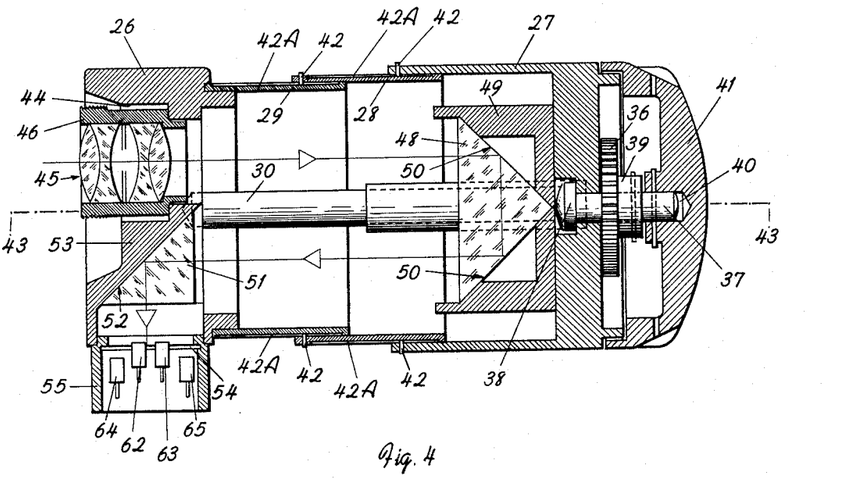
FIGURE 4 is a section taken substantially along the line 4—4 of FIGURE 3.

The telescoping action is provided by a double shaft and gear assembly in which forward hollow shafts 30, having their inner surfaces threaded, receive the threaded outer surfaces of the inner legs 31 of the rear shafts. The rear shafts comprise the threaded inner legs surrounded by outer casings 32 the inner surfaces of which bearingly contact the outer surfaces of the forward shafts so that the walls of the hollow forward shafts are received between the outer casings and threaded inner legs of the rear shafts. The front ends of the forward shafts are secured adjacent opposing sides of the chamber at the front piece 26, the back ends of the outer casings of the rear shafts are secured by bearing surfaces 33 in the rear piece. The back ends of the threaded inner legs of the rear shafts are journaled in the rear piece and extend therethrough to provide head pins 34 for shaft gears 35.

A central gear 36 extends radially from its center bearing pin 37 to mesh with the shaft gears on either side of the head adjacent the back surface of the rear piece. The central gear pin has a head 38 with its rear surface bearing against an indented inner surface of the rear piece. The pin body at the head end is journaled centrally in the rear piece, extends through the central gear and the central gear retaining ring 39 to an indented bearing surface 40 in a revolving turn piece 41. The turn piece is thereby mounted on the head and when turned effects a turning of the shaft gears, the threaded inner legs of the rear shaft and consequently the telescoping action between the parts. Circumferential stability and longitudinal slidable adjustment between the intermediate cylinders and between the rear cylinder and the rear piece is provided by adjustable bearing screws 42 which are threaded in screw holes provided in the rear piece and rear cylinder and have bearing surfaces which may be tightened in and positioned along the slots 42A disposed on opposite sides of the rear and front cylinders respectively. The front piece is inserted into the front cylinder at its front end and bears against the inner surface thereof by its own outer surface.

In the sensing head shown, the chamber may be said to be divided by a plane, indicated in FIGURE 4 at 43, passing through the longitudinal center line of the head. The adjusting shafts are disposed in this plane adjacent opposing inner surface sides.

On one side of the plane the front piece is formed with an opening 44 into which an anastigmatic lens system 45 retained by the lens casing 46 is inserted. A stop adjustment (not shown) for light intensity may be provided. The casing provides a threaded forward end to receive the threaded inner surface of a protective cylinder head 47. Centrally disposed at the rear of the chamber is a 180° prism 48 retained in its mounting 49 and secured to the inner surface of the rear piece so that its reflecting or mirrored surfaces 50 extend at angles 45° to an incident light beam (arrowed line path) passing the lens, and facing forward of the chamber so that one mirrored surface is on one side of the center plane and the other mirrored surface is on the other side.

Figure 1:
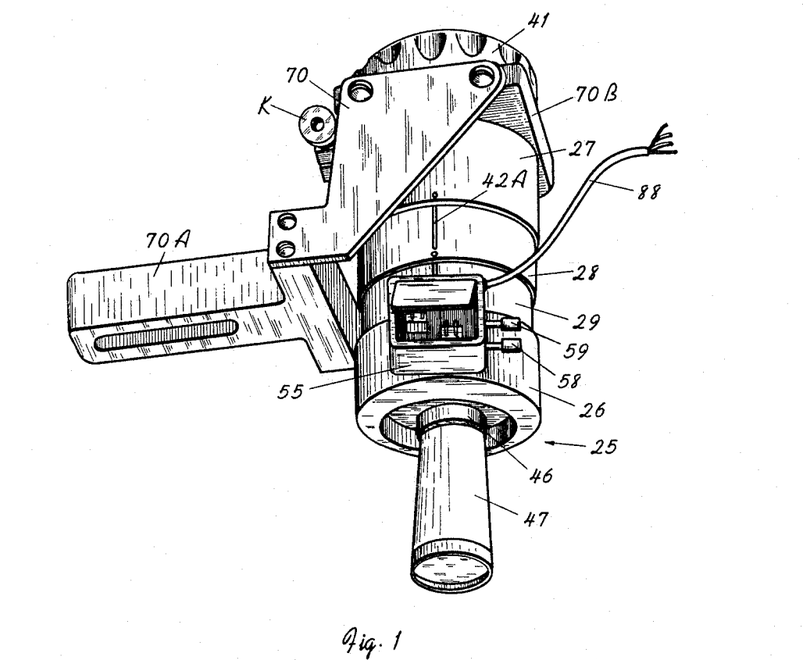
FIGURE 1 is a perspective view of a photo-electric optical head.
Figure 2:
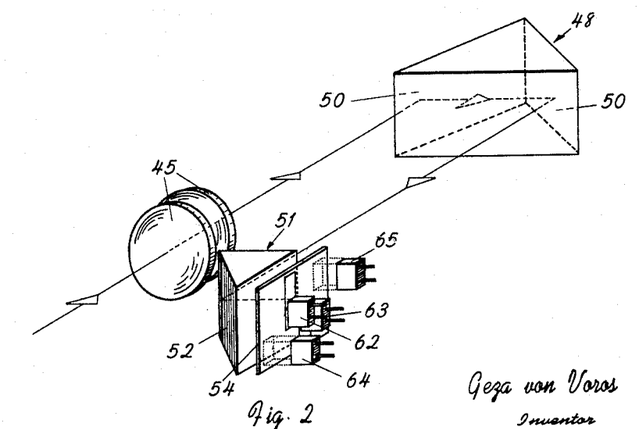
FIGURE 2 is a diagrammatic perspective view of the optical system used in the optical head of FIGURE 1 and showing the arrangement of the photocells.

The light beam, mirrored back to the front end of the head is met by a 90° prism 51, the mirrored surface 52 of which extends at an angle 45° to the plane of the reflected beam and parallel with the mirrored surface of the 180° prism extending on the same side of the center plane. The prism is secured to the forward inner surface of the front piece adjacent the lens system retaining opening.

Disposed in the focal plane of the image, mirrored from the second prism, is a panel of ground glass 54 through which an operator may see the image and adjust the factor of magnification with the turn piece. The panel is framed in the photocell housing 55 which is mounted adjacent and forms an integral part of the front piece. Elongated slots 60 and 61 are cut into the ground glass panel centrally thereof and have their longitudinal axes offset from one another extending from opposite sides of the margin of the panel to slightly past the center line thereof. These slots permit the insertion therethrough of two photocells 62 and 63, each mounted for displacement along the longitudinal axis of its respective slot and adjustable by the turning of their respective set screws 58 and 59 which move against the ends of the cells to actuate the compression springs S which connect the other ends of the cells and the photocell housing. Since the ground glass is placed in the focal plane of the image and the photocells have their sensitive surface also at the focal plane it will be seen that in effect the sensitive surfaces are placed directly on the surface to be scanned.

The cells are disposed so that their sensitive surfaces lie in approximately the same plane as the glass panel and facing the mirrored surface of the 90° prism. Two photocells 64 and 65 mounted adjacent opposing corners of the panel are disposed with the sensitive surfaces behind the frosted portion on the ground glass panel and also facing toward the mirrored image. In other words normally two photocells are subject to the direct light of the mirrored image at the focal plane while the other two photocells are subject to the diffused or visible picture portion of the image.

As the lens, prism 51 and the photocell housing are all components of the front piece, the entire assembly may be adjusted toward and away from the 180° prism 48, by movement of the turn piece 41. This arrangement permits double linear image distance for each change in the object distance effected by the turn piece adjustment. One of the advantages of the arrangement is that slight variations in the object distance, as are likely to occur during a tracing operation, will not significantly change the sharpness of the course image.

As will be discussed, cells 62 and 64 are electrically connected in series as are cells 63 and 65, each pair being disposed on a corresponding side of an electric bridge. Each side of the bridge is supplied by a polarizing voltage which is variable for some applications of course following. The polarizing voltage for either side is of opposite polarity. The electrical connection of all of the cells is selective so that any one, all or any combination of them may be operative at any given time. As a practical matter, the wire conductors connecting the cells in their circuit may be detachable and also provide means for varying the components of the circuit. For instance, a cell may be disconnected and a resistor inserted for external balancing of the bridge circuit. The desirability of external balancing will be later noted.

Figure 5:
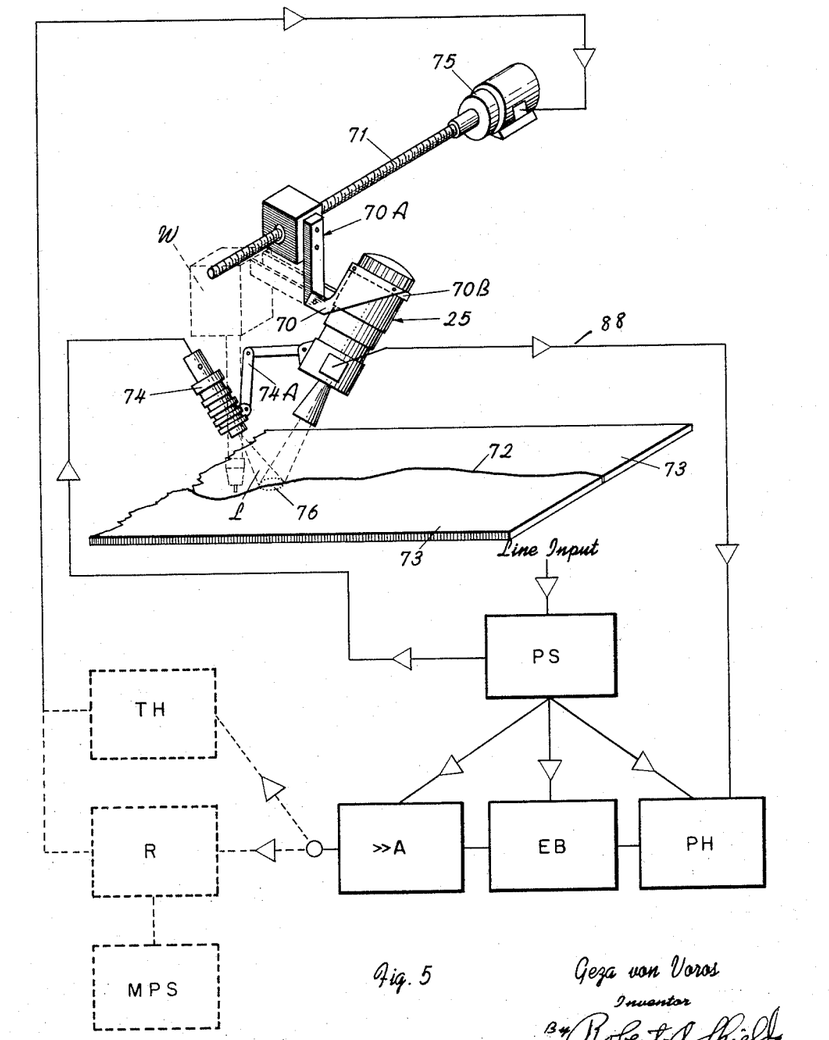
FIGURE 5 shows the general arrangement of the guiding system in diagrammatic form.

FIGURE 5 shows a general schematic arrangement of the guiding system with the sensing head secured by means of a mounting bracket 70 to positioner 70A which is movable by threaded engagement upon a shaft 71 to either side of a predetermined course 72, in this case a butt weld course between two metal sheets 73. The sensing head may be rotated in its bracket seat 70B to position the course line relative to the photocells, as shown in FIGURES 6–13. A light source 74 is shown attached to the sensing head by means of pivot links 74A. In some applications of the system in which the light source is used, it is preferably capable of producing an adjustable concentrated, heat filtered and intense light beam L. The shaft mounting the positioner element is driven in either direction by the positioner motor 75. The assembly comprising the light source, photocell-optical head, positioner, shaft and motor may be movable along the general direction of the welding course by any suitable means or the work piece may be made the movable element.

When the light source throws an intense beam upon the surface of the work piece, the illuminated area 76 is projected through the optical system of the sensing head in the form of a sharp picture. As the sensitive surfaces of the photocells are in a plane of the image at the photocell mounting, the image will be transformed into the form of low level electric current which is carried by connecting means 88 toward the photocell-stage, indicated at Ph, then passes into the electronic bridge indicated at EB which together with the amplifier stage A serves to amplify the current. The current is then high enough to operate a relay system, designated R, or to control the grids of a thyratron control, indicated Th. The thyratron output is connected to the positioner motor armature for reversible control of the positioner shaft. The relay system may be used for instance, where high powered positioner motors are needed or where in the case of stitch welding, described later, the control of a magnetic coil of a switch is the desired result. In such a case, a motor power source MPS is provided to supply the positioner motor under control of the contacts of the relay system R. It may also be used where delay between the sensing head and a welding head is desired. In such a case the welding head W would be directed by separate positioner means. In the case of thyratron control with no delay system, the welding head W is directed by the same positioner means as directs the sensing head. This condition is indicated in FIGURE 5 by dotted lines. A constant voltage power source, designated PS, supplies the various stages of the system and the light source.

Figure 6:
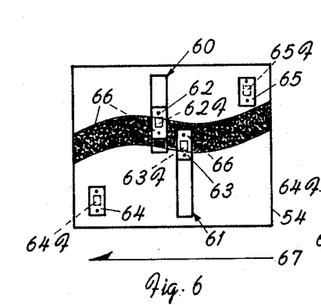
FIGURES 6, 7 and 8 show enlarged views of magnified courses and their relation to the photocells as may be seen in the optical head.
Figures 7, 8:
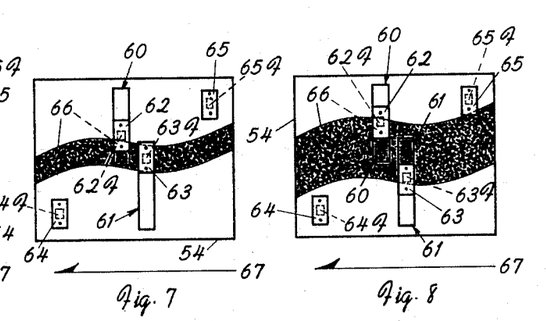

FIGURES 6 through 13 illustrate the various methods of following courses which may be utilized by the guiding system of the invention. Referring to FIGURES 6, 7 and 8, the image of the course to be followed 66 is magnified in the optical head and the plane of the image is disposed so that the course lies generally perpendicular to the longitudinal axes of the glass panel slots 60 and 61 in the photocell housing. This permits the photocells 62 and 63, disposed within the slots to be adjusted to have the fields of influence 62F and 63F of their sensitive surfaces, which in effect are the sensitive surfaces themselves, fall within the magnified image of a dark area course. Cells 64 and 65 are switched out of the bridge circuit and cells 62 and 63 are adjusted in their slots so that their surfaces lie adjacent the sides of the dark line area as seen in FIGURE 6. The adjustment in a wider dark area is shown in FIGURE 8. As the guiding system moves along the course to be followed in the direction indicated by arrow 67, an error in the course will result in either photocell 62 (FIGURE 7) or photocell 63 sensing light on either side of the dark course area. The current resulting from the sensitivity of the cell will unbalance the electric bridge of the photocell-stage and cause the positioning motor to operate until the sensing head is repositioned and the cell surfaces again are in the dark area of the image.

It will be appreciated that the sensing cells 62 and 63 may be placed, relative to different type courses, in a number of ways as along as the balance is kept in the electric bridge in which they form components. For example, the cells may be placed so that their fields of influence are on either side of a dark course line, or between two dark areas within a light course line, or on either side of the light course line in the adjacent dark areas as illustrated in the edge weld course in FIGURE 12c.

Figures 9, 10:
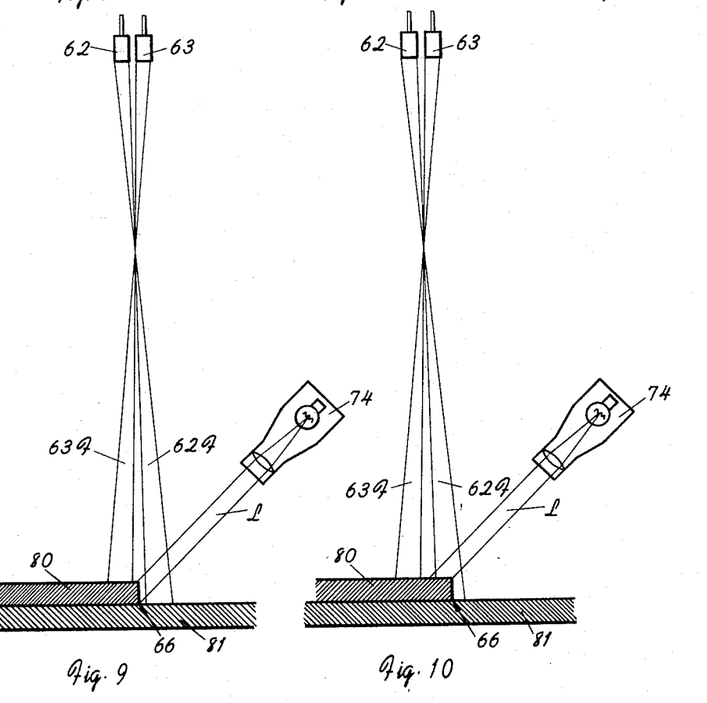
FIGURES 9, 10 and 11 show a lap joint course, in section, being followed by photocells and using an external lighting source.
Figure 11:
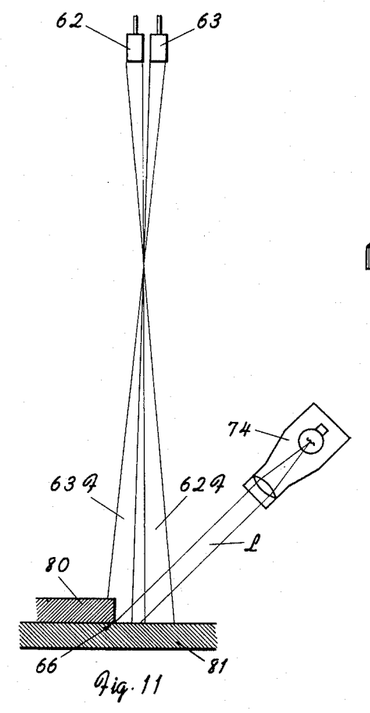
Figure 12:
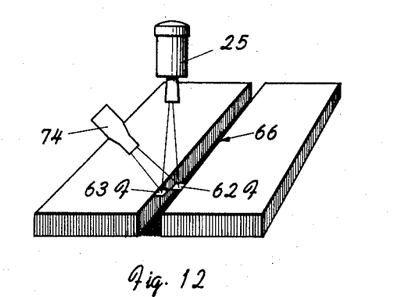
FIGURE 12 diagrammatically shows the optical head and light source following a slotted course.

For following lap joints between two work pieces, as shown in FIGURES 9 through 11 (showing the photocells and light source schematically) an intensified beam of light L from a light source 74 is made to strike only the vertical surface of an upper sheet 80. The photocells 62 and 63 are made to lie, relative to the magnified image, with their fields of influence 62F, 63F, one on the horizontal surface of the lower piece 81 directly adjacent the vertical edge, and one on the horizontal surface of the upper piece 80 directly adjacent the vertical edge, each horizontal surface reflecting less light than the vertical edge of the upper piece. The fields of influence are shown as reversed in the figures to indicate the affect of the optical system. If an error causes displacement of the work pieces to the right as seen in FIGURE 10, photocell 62 senses the intense light reflecting from the upper piece edge and causes a correction to be made by the positioner motor. If a relative movement results in the work pieces moving to the left (FIGURE 11), the light reflection on the surface of the lower piece is sensed by photocell 63 and a corresponding correction is made.

FIGURES 12a, and 12b show two other methods of utilizing the system for following lap joints. In FIGURE 12a instead of an external light source, the light of a welding arc 81 produced by welding head W may be used to brighten the horizontal surface of the lower work piece and the vertical edge of the upper piece. The sensitive surface 62F of one sensing cell, for instance 62, is disposed to be affected on the relatively dark upper piece, and the sensitive surface 63F of cell 63 is disposed to be affected over the edge thereof and receives light from the arc. Cells 64 and 65 are switched out of the photocell bridge circuit. The bridge circuit is then balanced in the photocell bridge by adjustment of the polarizing voltage and by external adjustment, as will be made clear. Any change in the amount of light on the sensitive surfaces of either cell will result in an error signal to the positioning control.

FIGURE 12b shows the external light source causing a shadow along the adjacent portions of the vertical edge of the top work piece and the horizontal surface of the bottom work piece. The sensitive surfaces 62F, 63F of the cells 62 and 63 respectively are positioned within the dark area of the magnified image and movement of either cell out of the dark area results in corrections by the positioning means.

Figure 13:
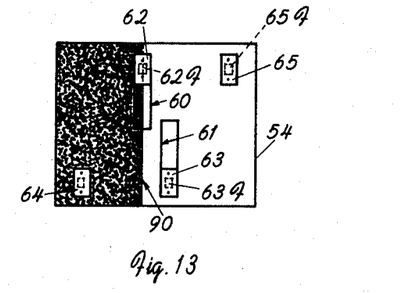
FIGURES 13, 13a and 13b show enlarged views of a magnified course defined by adjoining light and dark areas and its relation to the photocells, as may be seen in the optical head.

FIGURE 13 illustrates the problem of following a course between two surfaces, each one having a different co-efficient of reflection. This condition may be normal or effected by the open arc welding of a lap joint as in FIGURE 12a, or brought about by coating one of the surfaces. The surface coating method has application, for instance, in burn welding a metal sheet to a structural member disposed beneath or on the other side of the sheet. In such a case the coating edge may indicate the course followed by the member on the other side of the sheet.

Only one photocell, 62 for instance, is used to detect the border line 90, which is disposed relative to the lens system of the sensing head so that its image cuts across the cell's sensitive surface which then lies partially in the dark area and partially in the light area. Photocells 63, 64 and 65 are switched out of the bridge circuit of the photocell stage and the bridge circuit is then externally balanced in the following manner. A resistor, not shown, is connected in the side of the bridge which normally connects cells 63 and 65. The resistance value of the substituted resistor is equal to the resistance value of the partially affected cell 62. A balancing of the bridge is thereby effected. If movement of the course image effects an unbalanced state when the cell 62 senses more or less light (FIGURES 13a and 13b respectively), a correction signal will result.

Figure 13A:
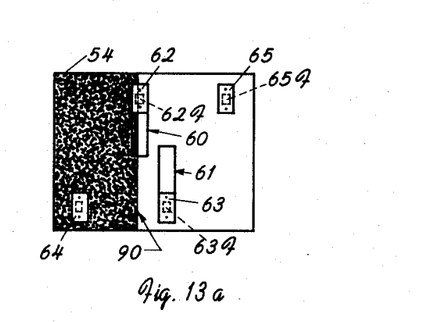
Figure 13B:
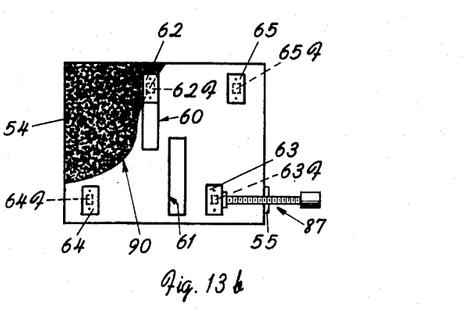

FIGURE 13b illustrates that the border line may be disposed diagonally across the field of influence of the sensing cell. In such a case, the optical head is turned in its support seat 70B so that correction signals will result in movements of the head in a direction transverse to the course being followed.

For applications of course following where sensitivity in higher ranges of light intensity or through changes thereof is required, a brightness control is provided by the present invention. Photocells 64 and 65 are positioned behind the ground glass panel 54 where they receive only diffused light. In the methods of the following courses using the two cells, 62 and 63, previously described with reference to FIGURES 6–12, the brightness control cells, 64 and 65, may be kept in the bridge circuit. The photocells utilized in the present guiding system are of the light sensitive resistor type, as for example the RCA photoconductive cell 6694–A. When changes in the co-efficient of reflection occur over the surfaces of the workpieces, both sides of the photocell bridge will become equally less resistive if there is an increase in light intensity within the fields of influence 64F and 65F of the cells, and will become more resistive if there is a decrease in light intensity. Consequently, the course sensing cells, 62 and 63, operate in the high ranges of light intensity just as well as under normal lighting conditions. They also operate through changes of light intensity during the course following. The guiding system is thereby given a greater area of sensitivity.

When brightness control is desired when using the one cell method of course following, as in FIGURES 13, 13a and 13b, photocells 63 and 65 may be used as the brightness control cells. In order to supply only diffused light to photocell 63, a simple adjustment structure 87 such as shown in FIGURE 13b may be provided to move the cell out of its slot 61 and behind the glass panel as indicated.

Figure 14:
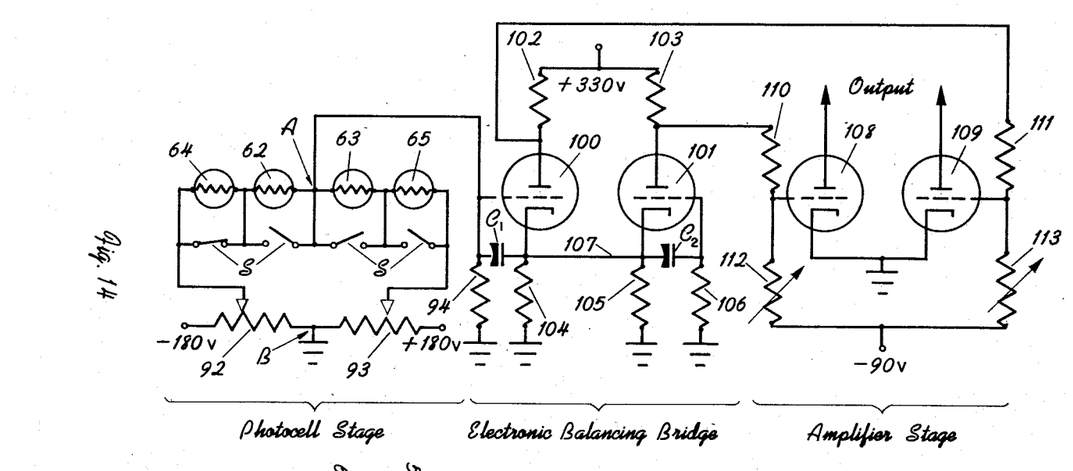
FIGURE 14 is a schematic diagram of the electronic circuitry used in the guiding system.

The photocell stage of the circuitry shown in FIGURE 14 is set up to follow a course between different reflecting surfaces (FIGURES 13, a and b), and utilizes the brightness control features of the system.

As previously stated, the photocell stage comprises an electric bridge. It is connected to ground at either end and with the grid resistor 94 of vacuum tube 100 of the electronic bridge stage connecting one end A of the bridge to its ground connection. The other end B of the bridge is connected to ground at the zero potential point of a ±180 volt power source. Potentiometers 92 and 93 are connected on either side of the ground connection of the B end of the bridge and are used to vary the polarizing voltage supplied to either side of the bridge. The wiper arms of the potentiometers connect the photocell end A of the bridge on either side thereof. Photocells 62 and 64 are connected in series on the left side of the A end, and photocells 63 and 65 are connected in series on the right side. The connections of the photocells are selectable by the use of switches S. Photocell 64 is switched out of the circuit and the bridge is balanced by adjustment of the polarization voltage with potentiometers 92 and 93 after placement of the photocell 62 across the course line. The net potential drop across resistor 94 will then be zero.

When the balanced state of the photocell bridge is disturbed because of a change in the relative positions of the course line 90 and cell 62, there results an increase or decrease in the resistance of the cell (FIGURES 13a and 13b). Because of the opposite polarity of the voltage input on either side of the bridge, the voltage drop of a signal current in either the negative or positive direction is picked off at the grid resistor 94 of tube 100. It will be seen that the grid of tube 100 may have either positive or negative bias.

As the bridge is initially balanced, where the intensity of illumination increases across the surface of the work piece because of welding arc flash or otherwise, and without relative change of position of the cell 62 and the course line, the photo current resulting on both sides of the bridge will be the same and no error signal will be supplied to the electronic bridge control stage. This result obtains because the resistance of cell 62, because of its receiving approximately half the amount of light received by either cell 63 or cell 65, will increase and decrease the same amount as the other two cells combined.

As in the previously described brightness control arrangement, the result is that the course sensing cell 62 may operate in the higher ranges of light intensity and through changes thereof without upsetting the sensitivity of the guiding system, and in fact, imparting a greater area of sensitivity to the system.

Another one cell method of course following, without using the brightness control, may be accomplished with the guiding system of the invention, where a welding operation, for instance, presents a wide course area, such as shown in FIGURE 8, between panels or work pieces, it may be desirable to oscillate the welding head from one side of the course to the other while at the same time moving the head longitudinally along the course to effect a stitch weld. In such a case the sensing cell is placed within the course which is shaded as in FIGURE 12. The other cells are switched out of the circuit and the bridge of the photocell stage is externally balanced as previously described. The output of the amplifier stage is connected through the contacts of a latch relay, not shown, to the relay coils. The relay has two connections to effect the positioner motor to drive in one predetermined direction and then the other. The positioner motor is switched on, and as at any given time, one of the two sets of the latch relay contacts are closed, the motor will drive the connected optical head and welding head to a side edge of the course where the sensing cell receives more light, sending an error signal to the latch relay to close the other set of relay contacts, whereby the positioner motor is reversed and drives the optical and welding heads to the opposite side of the course where a similar error signal operates the relay to set the system again across the course.

When balancing the bridge of the photocell stage, it should be understood that both sides of the bridge may be similarly treated as the arrangement of the photocells in the optical head is such that the course line image may be followed by a sensing cell on either side of the bridge. And too, the physical connections of the cells within the circuit can be taken advantage of to further increase the versatility of the photocell bridge. For instance, where it may not be desirable to use an external light source, and the reflected light from the surfaces of a course is of low intensity, the cells on either side of the bridge may be connected in parallel to effect a greater difference in current change for a given change in the reflected image.

The sensitivity and accuracy of the guiding system is further increased in the electronic stages of the circuitry, shown in FIGURE 14.

Referring again to FIGURE 14, the electronic balancing bridge comprises vacuum tubes 100 and 101 having a common plate voltage source of +330 volts supplied across plate resistors 102 and 103 respectively. Both tubes have cathode resistors 104 and 105 respectively, and grid resistors 94 and 106. The cathode and grid of each tube are connected across their resistors by the usual cathode capacitors $C_1$ and $C_2$ respectively. The cathodes of both tubes are also connected by a conductor 107 which in effect through capacitors $C_1$ and $C_2$ also connects the grids of tubes 100 and 101. Plate current variances of tubes 100 and 101 affect the grid input of tubes 108 and 109 respectively, of the amplifier stage through load resistors 110 and 111. The amplifier stage is a conventional class A amplifier. The grids of the tubes of the amplifier stage are biased by a −90 volt voltage source through grid resistors 112 and 113 shown as being variable for balancing of the electronic stages.

Whether one cell is used for course following, in which case the balanced state (no error signal) of the photocell bridge is effected by external adjustment, or two, three or four cells are used as already described, where the photocell stage bridge is initially balanced or balanced by adjustment of the potentiometers 92, 93, the grid bias of tube 100 will become more positive or more negative according to the side of the photocell bridge affected as a result of the cells receiving more or less light. If for instance, a higher photocurrent is conducted because of a greater intensity of received light in photocell 63 or 65, the grid bias of tube 100 becomes more positive and more plate current will flow through the tube and through both the cathode resistors 104 and 105 because there is a direct connection 107 between the cathode circuits of tubes 100 and 101. The resulting increased voltage drop across resistor 105 effects a decrease in plate current in tube 101 because of the increase in the grid bias of the tube. It is readily seen then, that if the plate current of tube 100 increases the circuit is such that the plate current of tube 101 decreases. Because of the cathode connection of the two tubes, the amplification factor of the circuit is doubled over the ordinary amplification factor of usual amplifier circuits.

The same, but opposite activity occurs if the left side of the photocell stage conducts more current. In this case the grid bias of tube 100 becomes more negative and the plate current will decrease. The decreased voltage drop across resistor 105 effects an increase in the plate current of tube 101.

The plate currents of tubes 100 and 101 provide the grid biasing of the amplifier tubes 108 and 109. The plates of the amplifier tubes are connected either through a load resistor or through the coil of a relay to the positive pole of the power source (not shown). The potential drop across the load resistor is used as a control signal for the thyratron control of the guiding system. When the coil of a relay is used, the coil may be the load resistor.

The guiding system of the invention is then a highly sensitive, yet highly accurate one. It provides an optical image of the course to be followed to permit the positioning of miniature photocells with their light sensitive surfaces within very small areas of the course. The RCA photocell utilized in the present guiding system has a sensitive surface of less than .0004 square inch. Extremely small course following errors are therefore detected. The use of the optical head also permits the use of the system at a distance from the course to be followed so that cutting tools or welding heads may closely follow the system without recourse to expensive delay systems. No contact other than optical contact between the system and the course is required to keep the system from leaving the course.

By using a plurality of photocells equally distributed in opposing arms of an electric bridge having a polarization voltage of opposite polarity on either side of the bridge, an extremely versatile guiding system is provided. Selectable connections for each photocell increases the versatility of the system. The use of brightness control cells permits the course sensing cells to operate in a wide range of light intensity and through changes thereof without affecting the operation of the system and imparts to the system a higher degree of sensitivity and efficiency.

Finally, the sensitivity, accuracy and stability of the system is further increased by the circuitry in which the photocell bridge and electronic balancing bridge cooperate to selectively respond to course following errors in either transverse direction. In each instance of error signal at the course image stage of the guiding system, and no matter in which transverse direction the error occurs, the entire system responds to produce a very high degree of amplification of the error signal and instantaneous correction.

Certain structures have been described herein which will fulfill all the objects of the present invention, but it is contemplated that other modifications will be obvious to those skilled in the art which come within the scope of the invention as defined by the appended claims.

What is claimed is:

1. A guiding system for guiding a welding head along a course defined by brightness differences between adjacent areas thereof, said guiding system comprising optical means for producing an image of said course, miniature photocell means mounted by said optical means and disposed in the focal plane of said image, positioner means mounting said optical means and the welding head for movement relative to the course, a four arm electric bridge circuit having two connected arms each containing a photocell means, electric power supply means connected to said bridge circuit and supplying a polarizing voltage of opposite polarity to the other two arms thereof, electronic means connected to said bridge circuit at one end thereof selectively responding to current signals from either photocell arm thereof, and means interconnected between said electronic means and said positioner means for reversibly controlling transverse movement of said positioner means relative to said course in response to said current signals.

2. The guiding system of claim 1, wherein said optical means and said welding head are spaced whereby the heat area of said welding head when operating does not injuriously affect said optical means, and said optical means produces at the focal plane thereof an image of said course immediately adjacent said welding head.

3. The guiding system of claim 1, wherein said miniature photocell means have light sensitive surface means of less than .0004 square inch.

4. A guiding system for following a course defined by brightness differences between adjacent areas thereof, said guiding system comprising optical means for producing an image of said course, photocell means mounted by said optical means and disposed in the focal plane of said image of said course, a four arm electric bridge circuit having two connected arms each including a photocell means, variable electric power supply means included in each of the other two arms of said bridge circuit and supplying a polarizing voltage of opposite polarity to the photocell arms, electronic means connected to said bridge circuit at the connection of said photocell arms for selectively amplifying the voltage of electric current signals from either photocell arm, said electronic means including two vacuum tubes disposed in opposing arms of an electronic bridge and having cathodes connected by a conductor and having common cathode biasing means whereby variations of current in one said arm inversely affects the current in the other said arm, and means interconnected between said electronic means and said optical means reversibly controlling transverse movement of said optical means relative to said course in response to said current signals.

5. The guiding system of claim 4 wherein said photocell means comprises a plurality of photocells, an equal number of which are selectably connected in series in each of said photocell arms.

6. The guiding system of claim 4 wherein said electronic means includes two vacuum tubes, each said vacuum tube being disposed in one arm of an electronic bridge, each said vacuum tube having a plate, a grid and a cathode, conductor means connecting said cathodes of said tubes, the grid of only one of said tubes thereafter being connected to the connection between said photocell arms of said electric bridge circuit, said plates of both said tubes having a common voltage source and being connected to said means interconnected between said electronic means and said optical means.

7. The guiding system of claim 4 wherein said course comprises surfaces of work pieces to be welded, said means interconnected between said electronic means and said optical means includes positioning apparatus for mounting said optical means, a welding head is mounted by said positioning apparatus, said positioning apparatus and said course are longitudinally movable relative to one another, and said positioning apparatus includes means responsive to said current signals for moving said optical head transversely of said course in one direction in response to current signals from one photocell arm of said electric bridge circuit and in the other direction in response to current signals from the other photocell arm of said electric bridge circuit.

8. A guiding system for following a course defined by brightness differences between adjacent areas of the course, said guiding system comprising an optical head for producing an image of said course, positioner means mounting said optical head for longitudinal and transverse movement relative to said course, a plurality of photocells mounted by said optical head, said photocells having light sensitive surfaces disposed in the plane of said image of said course, a four arm electric bridge circuit, at least one photocell connected in each of two arms, switching means for selectively bypassing a photocell in its respective arm of said electric bridge circuit, variable electric power supply means connected to said electric bridge circuit and forming the other two arms thereof for balancing said bridge circuit and supplying a polarization voltage of opposite polarity to either photocell arm thereof, electronic means connected to said electric bridge circuit at one end thereof for selectively amplifying the current signals received from either photocell arm thereof when said electric bridge circuit is unbalanced by the relative movement of said image of said course and said plurality of photocells, said electronic means including an electronic balancing bridge, said electronic balancing bridge including a first and second vacuum tube, each said vacuum tube having a grid and a cathode, a cathode bias resistor, a conductor connecting said cathodes of both tubes, said grid of only said first tube being connected to said one end of said electric bridge circuit, said tubes having plates with a common voltage supply, and means interconnected between said plates and said positioner means, said interconnected means and said positioner means being arranged to move said positioner means and said course relative to one another in one transverse direction when a current signal is received from one side of said electric bridge circuit and in the opposite transverse direction when a current signal is received from the other side of said electric bridge circuit.

9. The guiding system of claim 8 wherein said course includes surfaces of work pieces to be welded, a welding head, and means connecting said guiding system and welding head.

10. A photo-electric guiding system for following a course defined by brightness differences between two adjacent areas of the course, comprising, first and second photocell means, control means for increasing the range and variation of light intensity in which said photocell means may operate when disposed to be affected by said course, means including a four arm electric bridge circuit having branches of two arms connected at the ends thereof, said first photocell means being connected in one branch of said electric bridge circuit and disposed to be affected by the light from the said two adjacent areas, said second photocell means being connected in the other branch of said electric bridge circuit and disposed to be affected by one only of said two adjacent areas, said electric bridge circuit having a variable electric power source in each branch for initially balancing said electric bridge circuit and supplying a polarizing voltage of opposite polarity to either branch thereof, and means connected to one end of said electric bridge circuit and being selectively responsive to electric current signals from either branch thereof for varying the relative disposition of said photocell means to the course.

11. A guiding system for following a course defined by upper surfaces of upper and lower overlapping work pieces and the edge of the upper work piece adjacent said surfaces, said guiding system comprising a light source for illuminating said edge, photocell means perpendicularly oriented to said course and disposed to be selectively affected by vertically separated portions of either of said surfaces and normally straddling said edge, positioner means mounting said light source and said photocell means for longitudinal and transverse movement relative to said course whereby said light source illuminates either one of said vertically separated surfaces when said positioner means and said course move relative to one another in either transverse direction, a four arm electric bridge circuit having two branches, each branch containing one arm having a photocell therein and said arm connecting said photocell means of each branch, electric power supply means connected to said bridge circuit for supplying a polarizing voltage to the other arm of each branch and of opposite polarity to the other branch thereof, electronic means connected to said bridge circuit at the connection between the arms containing the photocells for selectively amplifying the voltage of electric current signals from either branch thereof, and means interconnected between said electronic means and said positioner means for reversibly controlling transverse movement of said positioner means relative to said course in response to said current signals.

12. A photocell-optical head comprising an elongated casing, said casing including telescoping front and rear sections, means connecting said front and rear sections for axially moving said sections relative to one another, a lens carried by said front section, a prism system carried by said rear and front sections and aligned with said lens to produce an image adjacent said front section, photocell means mounted by said front section and having the sensitive portions thereof in the focal plane of said image, a four arm electric bridge circuit having two branches connected together at the ends thereof with each branch including two arms, said photocell means being connected in one arm of each of the branches of said electric bridge circuit, electric power supply means connected to said electric bridge circuit and supplying a polarizing voltage to the other arm of each branch, the polarizing voltage being of opposite polarity in each of said other arms, and output means connected to a connection point between the branches of said electric bridge circuit whereby a selective current signal from either one branch or the other of said electric bridge circuit is provided.

13. The photocell-optical head of claim 12 wherein said photocell means are movably mounted by said front section whereby said photocell means may be adjustably displaced relative to said image in the focal plane of said image.

14. A bridge circuit for connecting photocell means to produce selectable electric current signals with voltages of opposite polarity, said bridge circuit comprising two branches connected at the ends thereof, photocell means connected in each of said branches, an electric power source for supplying a polarizing voltage to each branch and of opposite polarity in each of said branches, and output means connected to one of the connection points between the branches of said bridge circuit.

15. A guiding system for following an illuminated linear course defined by a brightness difference, comprising an optical head including optical means for projecting an image of a limited area including a portion of said course, a control circuit having a pair of output terminals and two branches connected in parallel between said terminals, an oppositely poled voltage source in each one of said branches, a course sensing photocell in each branch, means for positioning said photocells to receive light from small portions of said area which are adjacent said course and displaced laterally on opposite sides of said course, a second photocell connected in series with each course sensing photocell, said second photocells being positioned for receiving light from regions of said limited area located on opposite sides of said course, positioning means connected between the output terminals of said control circuit and the optical head for moving the optical head laterally of the course selectively in one direction or the opposite direction in response to the polarity of the output current of the control circuit and the magnitude of said current, and switching means for short-circuiting any of said photocells.

16. A system according to claim 15, including means for moving one of said photocells laterally of the course to a position where it no longer senses the course.

17. A system according to claim 15, including means in said optical head for diffusing the light falling on said second photocells.

18. A system according to claim 15, wherein said photocells are photosensitive resistors.

19. A system according to claim 15, comprising a light source and a welding head fixed to said optical head for movement therewith, said welding head being positioned to weld outside said area observed by the optical head, said light source having means for focusing the light on said area.

20. A system according to claim 15, comprising a head for arc welding fixed to said optical head for movement therewith, said welding head being positioned to arc weld outside of but immediately adjacent to said area observed by said optical head, said observed area being illuminated by the light from the welding arc.

21. The method of welding a workpiece, comprising establishing the desired course of the weld on the workpiece by producing a dark line thereon, positioning the head of a welder adjacent said course, affixing illuminating and optical scanning means to the welder head, continuously illuminating a portion of the course closely ahead of the welding head while moving the welding head along the workpiece longitudinally of the course, separately scanning two spots of the illuminated portion which are laterally spaced and so small that normally they lie entirely on said line, and moving the welding head back and forth transversely to the course in accordance with the relative brightness of the two scanned spots.

22. The method of welding along a visible course on a workpiece comprising positioning a welding head adjacent the course, moving the welding head along the workpiece in the general direction of the course, affixing illuminating and optical scanning means to the welder head, illuminating an area along the course at a fixed distance ahead of the moving welding head, optically scanning a portion of the illuminated area continuously, moving the welding head and the illuminated area and the scanned portion of said area in unison back and forth transversely to the course in accordance with the brightness variations of the scanned portion of the illuminated area for causing the welding head to follow the course.

23. The method of welding an elongated joint along a given visible course comprising positioning on the course a welding head which is adapted to be moved along the course, optically scanning two small spots on the course ahead of the welding head and spaced from each other in a direction transverse to the course, causing a difference between the brightness of the course and a region adjacent thereto resulting from illumination by the light generated by the welding head, and moving the welding head back and forth transversely to the course in accordance with the relative brightness of the two scanned spots.

24. The method according to claim 23, wherein one workpiece is superimposed on another for lap joint welding, whereby the upper face of the upper workpiece is in shadow, while the upper face of the lower workpiece is illuminated by the welding head, thereby defining an optical course for the weld.

References Cited in the file of this patent

UNITED STATES PATENTS

| | | |
|---|---|---|
| 2,237,950 | Pineo | Apr. 8, 1941 |
| 2,419,641 | Hart | Apr. 29, 1947 |
| 2,777,069 | Saeman | Jan. 8, 1957 |
| 2,946,894 | Powers | July 26, 1960 |
| 2,961,548 | Prell | Nov. 22, 1960 |
| 3,017,552 | Brouwer | Jan. 16, 1962 |
| 3,037,888 | Lobosco et al. | June 5, 1962 |

FOREIGN PATENTS

| | | |
|---|---|---|
| 622,472 | Great Britain | May 3, 1949 |
| 973,835 | Germany | June 23, 1960 |